United States Patent
Ciancutti et al.

(10) Patent No.: US 8,903,834 B2
(45) Date of Patent: Dec. 2, 2014

(54) RECOMMENDING GROUPS OF ITEMS BASED ON ITEM RANKS

(75) Inventors: John Ciancutti, Portola Valley, CA (US); Jonathan Michael Sanders, Los Gatos, CA (US); Neil D. Hunt, Los Altos, CA (US); Todd Scot Yellin, Los Gatos, CA (US)

(73) Assignee: Netflix, Inc., Los Gatos, CA (US)

( * ) Notice: Subject to any disclaimer, the term of this patent is extended or adjusted under 35 U.S.C. 154(b) by 523 days.

(21) Appl. No.: 12/905,014

(22) Filed: Oct. 14, 2010

(65) Prior Publication Data
US 2012/0096013 A1 Apr. 19, 2012

(51) Int. Cl.
 G06F 7/00 (2006.01)
 G06F 17/30 (2006.01)
(52) U.S. Cl.
 CPC .............................. *G06F 17/30997* (2013.01)
 USPC ................ 707/748; 707/749; 725/44; 725/46
(58) Field of Classification Search
 USPC ................................ 707/748, 749; 725/44, 46
 See application file for complete search history.

(56) References Cited

U.S. PATENT DOCUMENTS

| | | | |
|---|---|---|---|
| 7,882,111 B2 * | 2/2011 | Chien et al. | 707/749 |
| 8,095,432 B1 * | 1/2012 | Berman et al. | 705/26.7 |
| 2005/0033657 A1 * | 2/2005 | Herrington et al. | 705/26 |
| 2008/0294617 A1 | 11/2008 | Chakrabarti et al. | |
| 2009/0006371 A1 * | 1/2009 | Denoue et al. | 707/5 |
| 2009/0094285 A1 | 4/2009 | Mackle et al. | |
| 2010/0223258 A1 | 9/2010 | Ghahramani et al. | |
| 2010/0250341 A1 * | 9/2010 | Hauser | 707/749 |
| 2010/0251305 A1 * | 9/2010 | Kimble et al. | 725/46 |
| 2012/0089621 A1 * | 4/2012 | Liu et al. | 707/749 |

OTHER PUBLICATIONS

International search report and written opinion for application No. PCT/US2011/056397 dated Jan. 19, 2012.

* cited by examiner

*Primary Examiner* — Hosain Alam
*Assistant Examiner* — Jieying Tang
(74) *Attorney, Agent, or Firm* — Patterson + Sheridan, LLP (57) ABSTRACT

One embodiment of the invention sets forth a mechanism for recommending digital items to a user. Each digital item in a set of digital items is scored based on user preferences and other metrics. The digital items are ordered based on scores. The digital items are then evaluated in order of respective rank to determine a subset of digital items that re recommended to the user. The evaluation process is based on different evaluation criteria as well as the presentation style of the recommended digital items.

19 Claims, 5 Drawing Sheets

| Rank 302 | Digital Item 304 | Metadata Tags 306 |
|---|---|---|
| 1 | A | T1, T2, T3 |
| 2 | B | T1, T3, T4 |
| 3 | C | T1, T2, T3 |
| ⋮ | | ⋮ |
| N | Z | T1 |

| Row Definition 312 | Digital Items 314 |
|---|---|
| {T1} | A, B, C |
| {T2} | A, C |
| {T3} | A, B, C |
| {T1, T2, T3} | A, C |
| {T1, T3, T4} | B |

RECOMMENDING GROUPS OF ITEMS BASED ON ITEM RANKS

BACKGROUND OF THE INVENTION

1. Field of the Invention

The present invention relates generally to online commerce and, more specifically, to recommending groups of items based on item ranks.

2. Description of the Related Art

Conventional digital content distribution systems usually include a content server, an application, a content player, and a communications network connecting the content server to the content player. The content server is configured to store digital content files corresponding to different content titles that can be downloaded from the content server to the content player. The application allows a user of the content player to browse through available digital content and manage account information, etc.

Typical digital content distribution systems offer a large variety of digital media to the user for viewing. In order to enhance the user experience, content distribution systems often personalize digital media recommendations to the individual user, recommending a number of items in a number of groups, e.g. where items are movies, group definitions might be "Dark Comedies" or "80's Thrillers". One approach to selecting the group definitions to recommend is to examine the user's previously selected items, identify group definitions those items belong to, and select the most frequently occurring of those group definitions. One drawback of this approach does not consider the desirability of the items for the user, so may fail to recommend the most desirable items to the user As the foregoing illustrates, what is needed in the art is a mechanism for recommending groups of digital content to a user that contain the most desirable items for the user.

SUMMARY OF THE INVENTION

One embodiment of the present invention sets forth a method for recommending digital items to a user. The method comprises the steps of, for each digital item in a set of digital items, computing a desirability score based on one or more scoring metrics, for each digital item in the set of digital items, determining a rank relative to the other digital items in the set of digital items based on the desirability score associated with the digital item, and evaluating one or more digital items in the set of digital items, in order of respective rank, to determine the group definitions the items are members of, then computing a desirability score for each group definition based in part on the rank of the items it contains, and selecting the group definitions with the best scores and their contained digital items to recommend to the user.

One advantage of the disclosed method is that the digital items are evaluated for recommendation according to a rank that reflects the desirability of the digital item to the user. In such a fashion, when recommending digital items, those digital items having higher desirability are evaluated with a higher priority relative to digital items that may not be desirable to the user.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
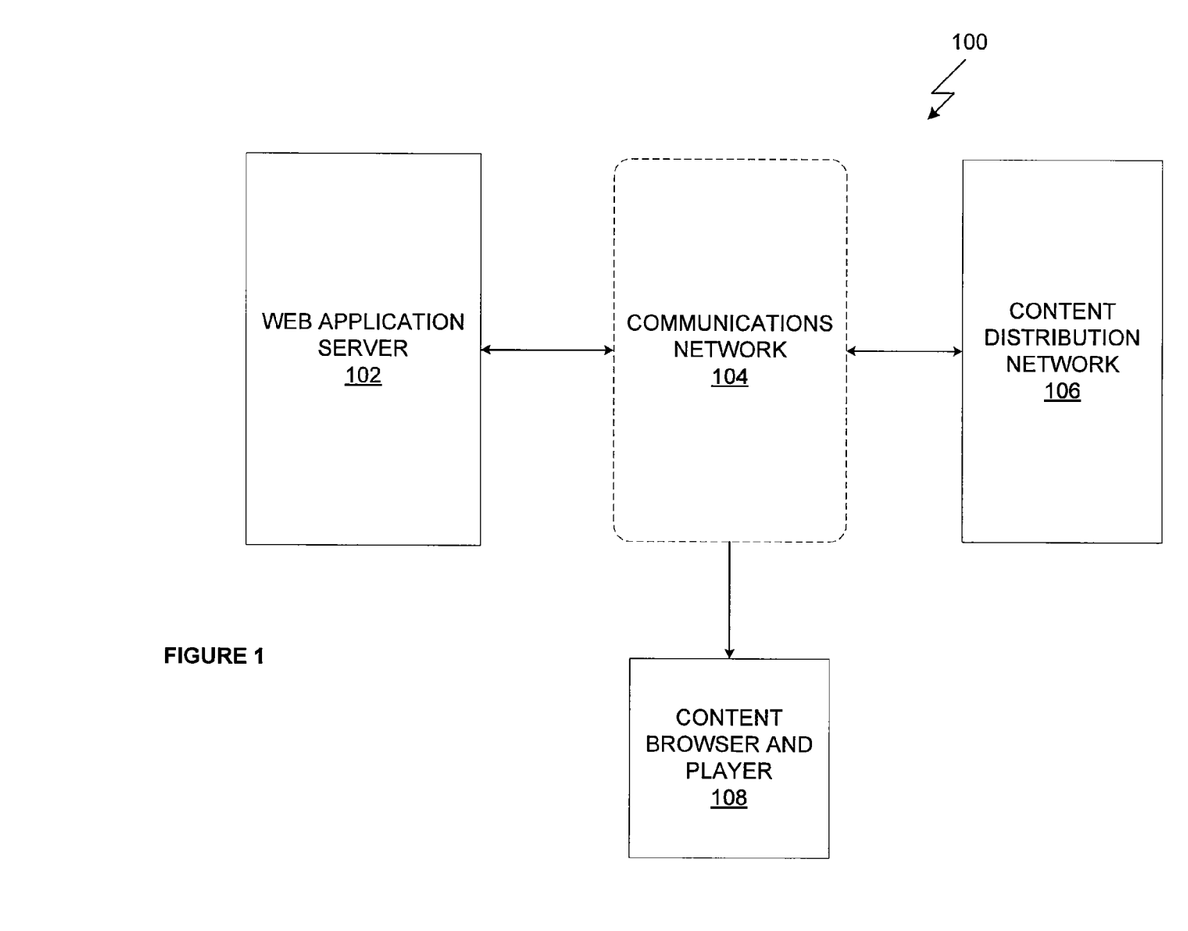
FIG. 1 illustrates a content browsing and distribution system configured to implement one or more aspects of the invention.

FIG. 1 illustrates a content browsing and distribution system 100 configured to implement one or more aspects of the invention. As shown, the content browsing and distribution system 100 includes a web application server 102, a communications network 104, a content distribution network (CDN) 106 and a content browser and player 108.

The communications network 104 includes a plurality of network communications systems, such as routers and switches, configured to facilitate data communication between the web application server 102, the CDN 106 and the content browser and player 108. Persons skilled in the art will recognize that many technically feasible techniques exist for building the communications network 104, including technologies practiced in deploying the well-known internet communications network.

The web application server 102 is a computer system configured to host a web application that is accessed by the content browser and player 108. The web application hosted by the web application server 102 allows a user of content browser and player 108 to browse through available digital content, manage account information, receive content recommendations, etc. One embodiment of the content recommendation functionalityis discussed in greater detail below in conjunction with FIGS. 2-4.

The CDN 106 comprises one or more computer systems configured to serve download requests for digital content files from the content browser and player 108. The digital content files may reside on a mass storage system accessible to the computer system. The mass storage system may include, without limitation, direct attached storage, network attached file storage, or network attached block-level storage. The digital content files may be formatted and stored on the mass storage system using any technically feasible technique. A data transfer protocol, such as the well-known hyper-text transfer protocol (HTTP), may be used to download digital content files from the content server 106 to the content browser and player 108.

The content browser and player 108 may comprise a computer system, a set top box, a mobile device such as a mobile phone, or any other technically feasible computing platform that has network connectivity and is coupled to or includes a display device and speaker device for presenting video frames, and generating acoustic output, respectively. The content browser and player 108 interacts with the web application server 102 and the CDN 106 to display available digital content information, gather user preferences and play digital content files.

Although, in the above description, the content browsing and distribution system 100 is shown with one content browser and player 108 and one CDN 106, persons skilled in the art will recognize that the architecture of FIG. 1 contemplates only an exemplary embodiment of the invention. Other embodiments may include any number of content browser and players 108 and/or CDNs 106. Thus, FIG. 1 is in no way intended to limit the scope of the present invention in any way.

Figure 2:
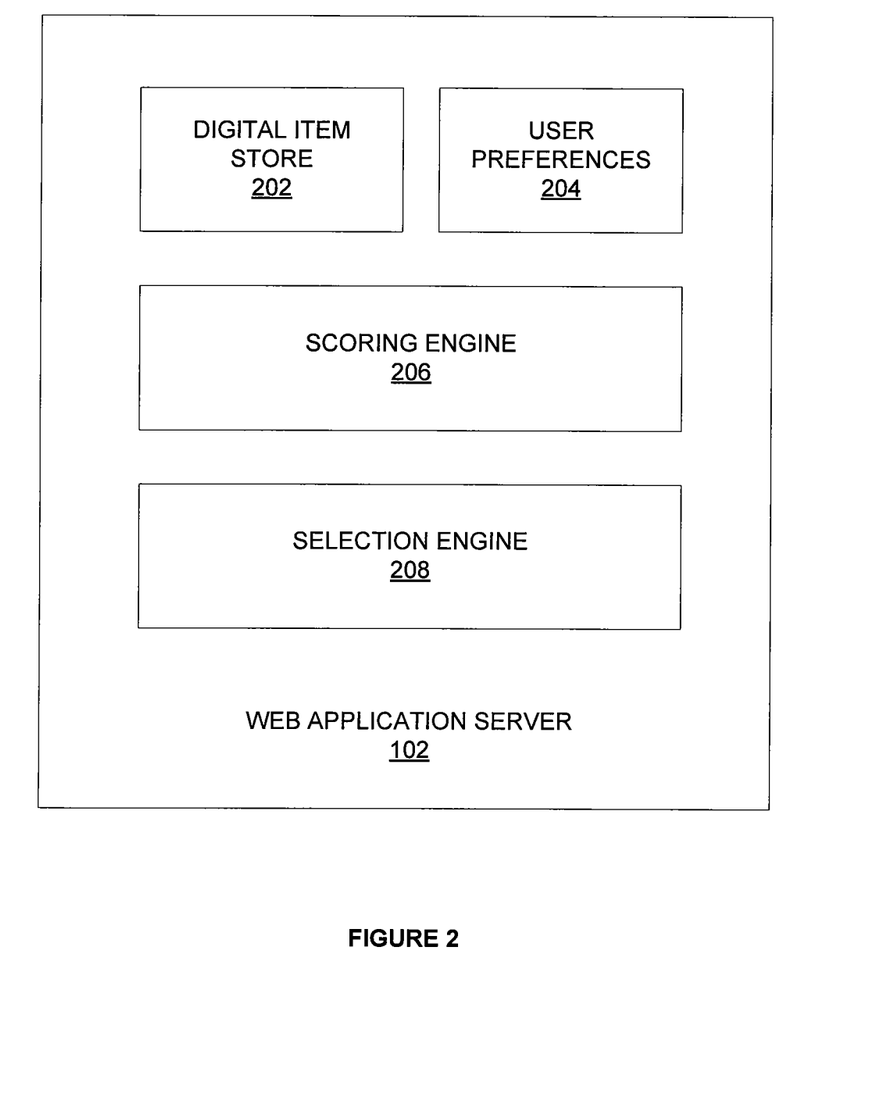
FIG. 2 is a more detailed illustration of the web application server of FIG. 1, according to one embodiment of the invention.

FIG. 2 is a more detailed illustration of the web application server 102 of FIG. 1, according to one embodiment of the invention. As shown, the web application server 102 includes a digital item store 202, a scoring engine 204 and a selection engine 206.

The digital item store 202 specifies the set of available digital items that can be recommended to the user. For each available digital item, the digital item store 202 includes an identifier associated with the digital item as well as other information associated with the digital item. In addition, for each available digital item, the digital item store 202 stores one or more metadata tags indicating different attributes associated with the digital item. As an example, digital item A may be associated with three different metadata tags, "Comedy," "90s," and "Jim Carey," and digital item B may be associated with only two different metadata tags, "Horror" and "Stephen King." In one embodiment, the digital item store stores only identifiers associated with the available digital items and the actual audio/video content of the digital items is stored in the CDN 106.

User preferences 204 specify metrics indicating the interests of the user operating the content browser and player 108. The user preferences 204 may specify metadata tags for which the user of the content browser and player 108 has explicitly or implicitly expressed interest or disinterest. Explicit evidence specifies a list of metadata tags for which the user has explicitly expressed a negative or positive preference. Explicit evidence is gathered based on the user providing explicit information regarding specific metadata tags. For example, the user may explicitly indicate that the metadata tag "Comedy" is of interest, while the metadata tag "Horror" is not of interest. Implicit evidence specifies a list of metadata tags for which the user has implicitly expressed a negative or positive preference. Implicit evidence is gathered based on the interactions of the user with digital content associated with specific metadata tags. For example, the user may poorly rate digital content associated with the "Comedy" metadata tag, or the user may repeatedly request digital content with the "Horror" metadata tag. In such a manner, based on the digital content the user has interacted with, a list of metadata tags in which the user is implicitly interested or disinterested is gathered in the implicit evidence. In one embodiment, only digital content the user has interacted with in the recent past are used to determine the list of metadata tags in which the user is implicitly interested or disinterested.

When recommending digital content to the user of the content browser and player 108, the scoring engine 206 first computes a score for each digital item specified by the digital item store 202. The scoring mechanism implemented by the scoring engine 206 may be based on the ratings of the digital item, the popularity of the digital item among different users and/or a metric indicating how recently the digital item was displayed to the user (referred to herein as the "freshness metric"). The scoring mechanism may also take the user preferences 204 into account when determining a score for a specific digital item. Any technically feasible scoring algorithm for computing a score for each digital item specified by the digital item store 202 is contemplated by the current invention.

Once a score is computed for each digital item, the scoring engine 206 ranks each digital item relative to the remaining digital items based on the corresponding scores to generate a list of ranked digital items. The rank of a digital item is the position of the digital item in a list of digital items that is sorted based on the scores of the digital items. In one embodiment, the digital item with the highest score, i.e. the most desirable item for the user, is ranked number 1, the digital item with the second highest score is ranked number 2, etc. For discussion purposes, in the following paragraphs a digital item with the lowest rank refers to the digital item that is ranked number 1 and the digital item with the highest rank refers to the digital item that is ranked number N, where N is the total number of digital items.

The selection engine 206 determines groups of recommended digital items for display to the user based on the corresponding ranks of the digital items. More specifically, the selection engine 206 evaluates digital items within the list of ranked digital items in order of the corresponding ranks to determine the set of recommended digital items. The evaluation of the ranked digital items is based on different metrics and/or styles of presentation of the recommended digital items. For example, a "top ten" style presentation may specify a predicted rating restriction (e.g. only digital items having ratings 3.75 or higher). Therefore, for the "top ten" style presentation, the selection engine 206 determines the set of recommended digital items by starting at the top of the ranked list of digital items and evaluating each digital item in turn for inclusion in the set of recommended digital items based on the corresponding predicted ratings.

For a row-based presentation of the recommended digital items, the selection engine 206 evaluates digital items to determine a set of recommended groups of items to display as rows. Each recommended group includes one or more digital items and is associated with a particular group definition identifying a set of metadata tags. When evaluating a digital item within the list of ranked digital items, the selection engine 206 determines the group definitions associated with the digital item based on the one or more metadata tags associated with the digital item. For example, the digital item A that is associated with the metadata tags "Comedy" and "90s," is included in three different group definitions, "Comedy," "90s" and "Comedy from the 90s."

In operation, the selection engine 206 begins with the lowest ranked digital item in the list of ranked digital items and determines the group definitions associated with the lowest ranked digital item. The selection engine 206 then continues to determine the group definitions associated with next ranked digital items until a set of recommended groups can be selected for display to the user. The set of recommended groups are selected from the group definitions associated with the evaluated digital items. Each group definition is assigned a group score derived from multiple factors including the rank of the items in the group, and the group definition with the best scores are selected for recommendation. An example group score function is the average rank of the 5 lowest ranked items in the group divided by the number of metadata tags in the group definition, wherein a lower group score is better than a higher group score. A group definition associated with one or more evaluated digital items is eligible for recommendation if one or more pre-determined criteria are fulfilled. The criteria can specify a pre-determined number of digital items that should be associated with a group definition for the group definition to be selected. The criteria can also specify page-specific rules regarding the types of metadata tags that can be displayed. The criteria can also specify a maximum number of group definitions identified by at least one overlapping metadata tag that can be included in the set of recommended groups.

The criteria can also specify that the same digital item should not be displayed in multiple groups. In this case, once one group definition is selected for recommendation, the digital items in that group definition are removed from the remaining unselected group definitions, and their group scores recomputed.

Once the digital items for recommendation are selected, the digital items are displayed to the user of the content browser and player 108. When a digital item is displayed, the freshness of the digital item is affected, thus influencing the score and the corresponding digital item. Therefore, subsequent recommendations to the user are likely to not include a recently displayed digital item. In one embodiment, there may be a session-specific freshness score and a longer-term freshness score. In other words, a simple, fast implementation of freshness may be used to update rank within a session (e.g. when a digital item is displayed, the rank is updated to be three times the previous rank). Between sessions, any other more complex implementation of freshness can be used and the session-version can be discarded.

In alternate embodiments of the invention, the scoring engine 206 does not rank each digital item relative to the remaining digital items. In such embodiments, the desirability score of each digital item may be used directly by the selection engine 206 to determine groups of recommended digital items for display or another technically feasible methodology may be applied to the desirability score of each digital item to determine the relative values of the digital items.

Figure 3A:
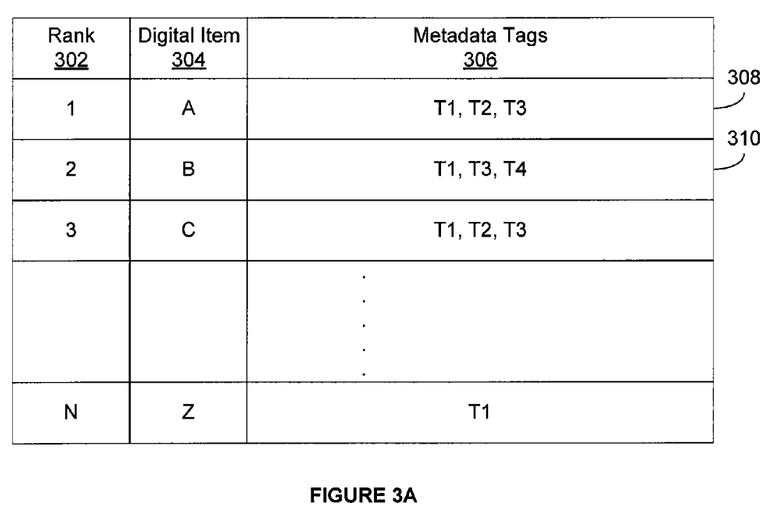
FIG. 3A is a conceptual diagram illustrating a list of ranked digital items, according to one embodiment of the invention.

FIG. 3A is a conceptual diagram illustrating a list of ranked digital items, according to one embodiment of the invention. As shown, digital items 304 are ordered based on corresponding ranks 302, and each digital item 304 is associated with different metadata tags 306. For example, digital item A 308 has the lowest rank and is associated with three metadata tags, T1, T2, and T3. Similarly, digital item B 310 has the second lowest rank and is associated three metadata tags, T1, T3 and T4.

Figure 3B:
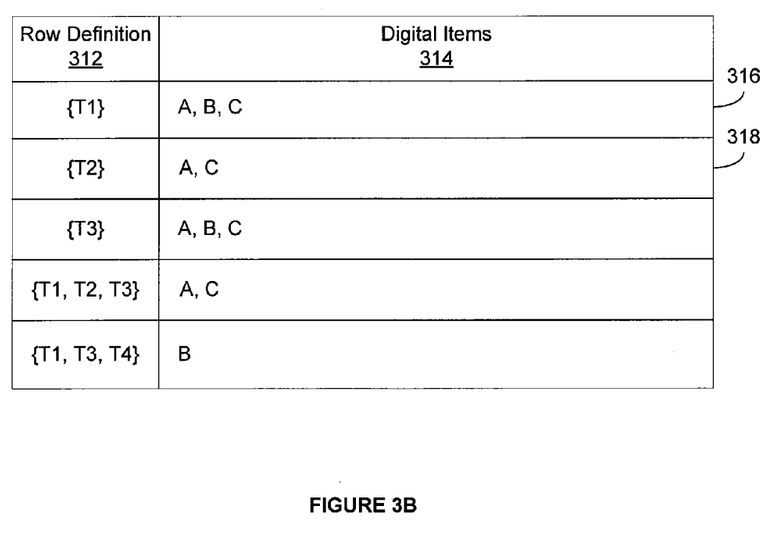
FIG. 3B is a conceptual diagram of group definitions associated with the digital items of FIG. 3A, according to one embodiment of the invention.

FIG. 3B is a conceptual diagram of group definitions associated with the digital items 304 of FIG. 3A, according to one embodiment of the invention. As previously described herein, the selection engine 208 evaluates different digital items by determining the group definitions associated with the digital items. As shown in FIG. 3B, each group definition 312 is defined by specific metadata tags and includes digital items 314. Each digital item 314 included in a group definition 312 is associated with all the metadata tags defining the row definition 312. For example, group definition 316 includes digital item A, digital item B and digital item C, and each of digital item A, B and C are associated with the metadata tag T1 that defines the group definition 316. Similarly, group definition 318 includes digital item A and digital item C, and each of digital item A and C are associated with the metadata tag T2 that defines the group definition 318. As previously described, once the group definitions associated with the evaluated digital items is determined, the selection engine 208 selects a set of recommended groups including digital items that are displayed to the user.

Figure 4:
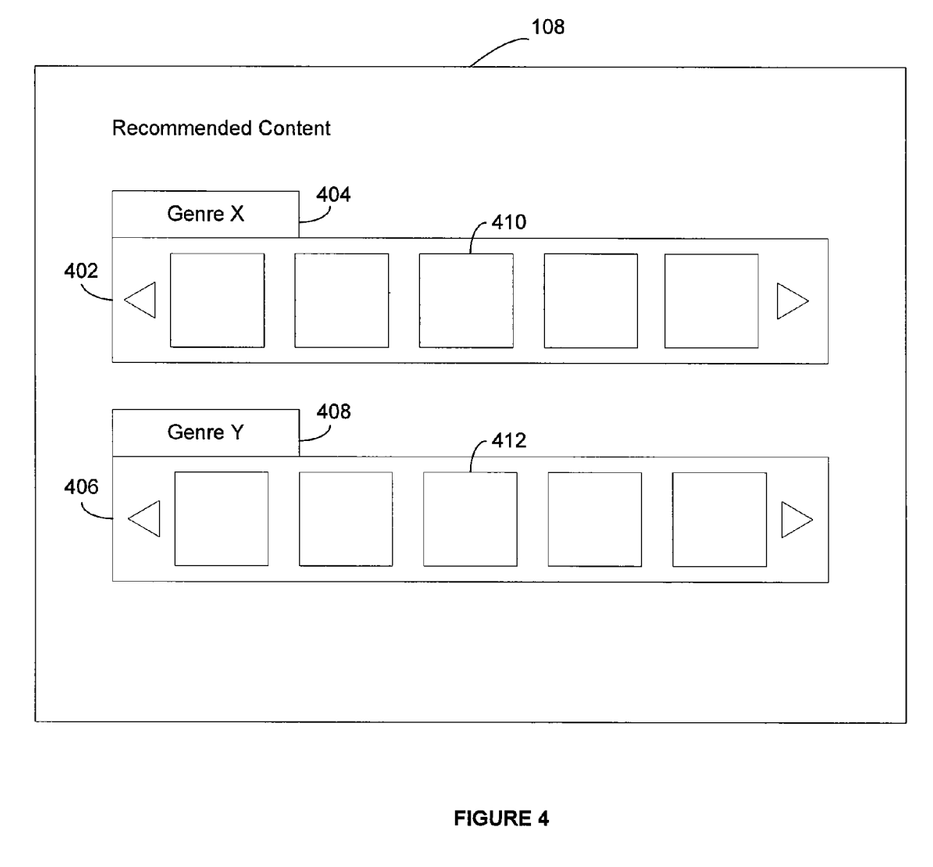
FIG. 4 is a conceptual diagram illustrating recommended group definitions shown as rows in the content browser and player of FIG. 1, according to one embodiment of the invention.

FIG. 4 is a conceptual diagram illustrating recommended groups displayed in content browser and player 108 of FIG. 1, according to one embodiment of the invention. As shown, the content browser and player 108 includes row 402 associated with group definition 404 and row 406 associated with group definition 408. Each of group definition 404 and group definition 408 is recommended to the user of the content browser and player 108 based on the evaluation of the digital items associated with the group definitions. Row 402 includes digital items, such as digital item 410, that are associated with metadata tags identifying the group definition 404. Similarly, Row 402 includes digital items, such as digital item 412, that are associated with metadata tags identifying the group definition 404.

Figure 5:
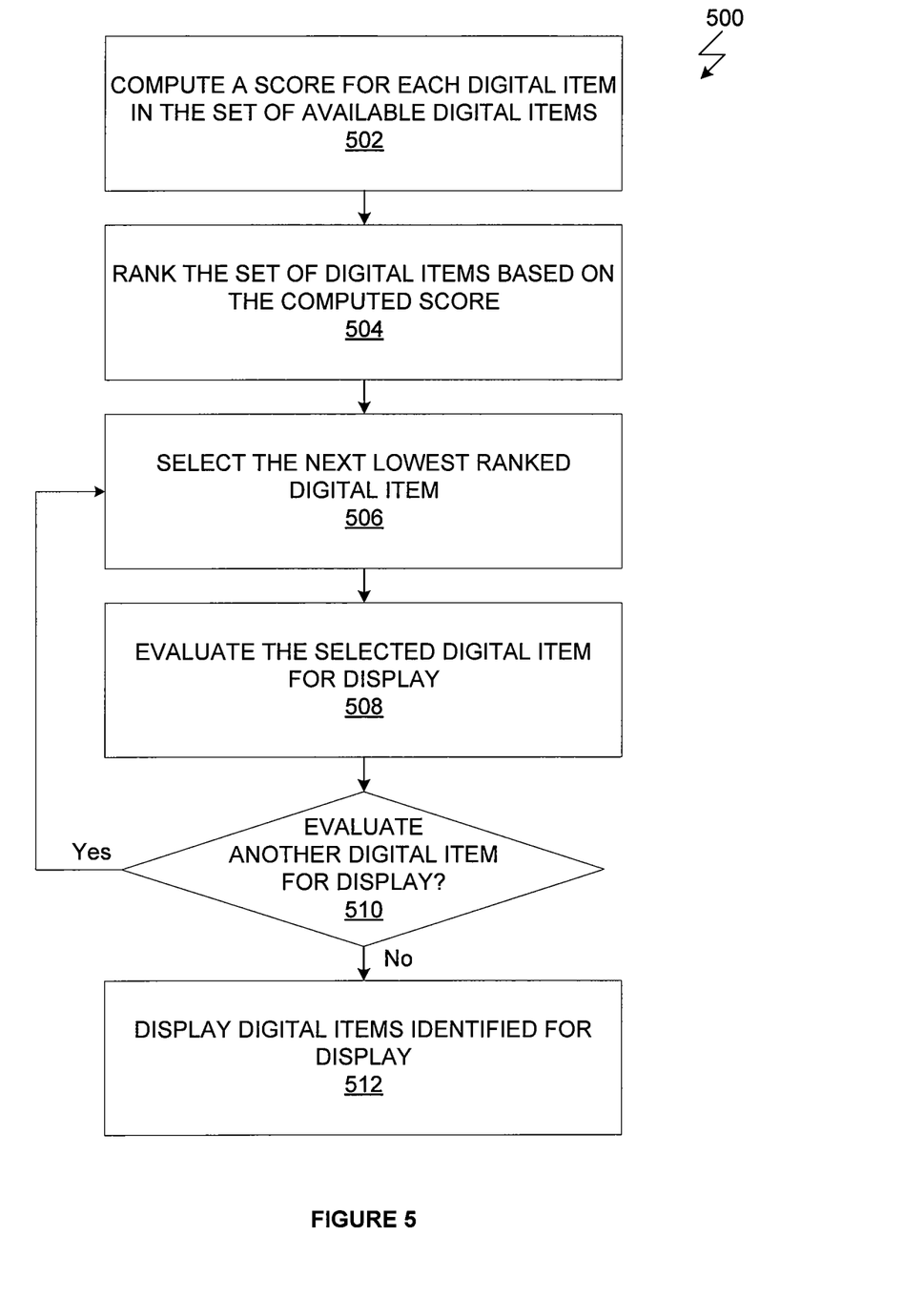
FIG. 5 is a flow diagram of method steps for identifying one or more digital items for recommendation to a user, according to one embodiment of the invention.

FIG. 5 is a flow diagram of method steps for identifying one or more digital items for recommendation to a user, according to one embodiment of the invention. Although the method steps are described in conjunction with the systems for FIGS. 1-4, persons skilled in the art will understand that any system configured to perform the method steps, in any order, is within the scope of the invention.

The method 500 begins at step 502, where the scoring engine 206 computes a score for each digital item specified by the digital item store 202. As previously described herein, the scoring mechanism implemented by the scoring engine 206 may be based on the ratings of the digital item, the popularity of the digital item among different users, user preferences and/or a metric indicating how recently the digital item was displayed to the user (referred to herein as the "freshness metric").

At step 504, the scoring engine 206 ranks each digital item relative to the remaining digital items based on the corresponding scores to generate a list of ranked digital items. The rank of a digital item is the position of the digital item in a list of digital items that is sorted based on the scores of the digital items. At step 506, the selection engine 206 selects the next lowest ranked digital item for evaluation. As previously described, a digital item having a low rank has a higher likelihood of being of interest to a user relative to a digital item having a higher rank.

At step 508, the selection engine 206 evaluates the selected digital item to determine whether the digital item should be recommended to the user. The evaluation of the digital item is based on different metrics and/or styles of presentation of the recommended digital items. At step 510, the selection engine 206 determines whether more digital items need to be evaluated or whether enough digital items have been selected for recommendation to the user. If more digital items need to be evaluated, then, at step 510, the selection engine 206 returns to step 506, previously described herein. If more digital items do not need to be evaluated, then, at step 512, the selection engine 206 displays the digital items selected for recommendation to the user within the content browser and player 108.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for recommending digital items to a user, the method comprising:
    identifying, for each digital item in a set of digital items, at least two group definitions in which the digital item is classified;
    for each digital item in the set of digital items, computing an item desirability score based at least on a session freshness and a long-term freshness of the digital item indicating how recently the digital item was viewed by the user during a current session and multiple sessions, respectively, wherein the session freshness and the long-term freshness of the digital item are different measures of freshness, and wherein a first item and a second item in the set of digital items, when viewed during the current session, have the same session freshness and a different long-term freshness;
    ranking each digital item in the set of digital items relative to the other digital items in the set of digital items based on the respective item desirability scores;
    computing, for each of the at least two group definitions, a group score based on: (i) user group preferences and (ii) the ranked item desirability scores of the digital items in each respective group definition; and
    outputting for display a first group definition, of the at least two group definitions, and the respective digital items in the first group definition, wherein the set of digital items are ordered based on the rank associated with each digital item.

2. The method of claim 1, wherein identifying the at least two group definitions of the one or more digital items comprises identifying one or more metadata tags associated with a first digital item of the one or more digital items, wherein the item desirability score is further based on: (i) a rating and (ii) a popularity of the digital item.

3. The method of claim 2, wherein each group definition is defined by a different set of metadata tags, wherein each group definition includes at least one digital item of the one or more digital items, and wherein each metadata tag defining a group definition is included in the one or more metadata tags associated with the at least one digital item included in the group definition.

4. The method of claim 2, further comprising:
    removing each digital item included in the first group definition from the remaining at least two group definitions; and
    re-computing the group score for each group definition in the remaining at least two group definitions based on (i) the ranked item desirability scores, (ii) the session freshness, (iii) the long-term freshness, and (iv) a popularity among different users of the digital items in each respective group definition.

5. The method of claim 4, wherein the re-computed score is further based on the number of digital items associated with a group definition.

6. The method of claim 4, wherein the re-computed score is further based on the number of metadata tags associated with a group definition, wherein the item desirability score is further based on: (i) a user preference for each group definition of the digital item, and (ii) a user preference for the digital item, wherein the user preference for each group definition and the user preference for the digital item comprise: (i) explicit and (ii) implicit evidence of a set of metadata tags for which the user has a preference, wherein the implicit evidence is gathered based on interactions of the user with digital items associated with specific metadata tags.

7. The method of claim 6, wherein the user group preferences indicate a user preference of at least one group definition, wherein the user group preferences and user item preferences comprise: (i) explicit and (ii) implicit evidence of a set of metadata tags for which the user has a preference, wherein the implicit evidence is gathered based on interactions of the user with digital items associated with specific metadata tags.

8. The method of claim 7, wherein each group definition is defined by a different set of metadata tags, wherein each group definition includes at least one digital item of the one or more digital items, and wherein each metadata tag defining a group definition is included in the one or more metadata tags associated with the at least one digital item included in the group definition.

9. A non-transitory computer-readable storage medium storing instructions that, when executed by a processor, cause the processor to recommend digital items to a user, by performing the steps of:
    identifying, for each digital item in a set of digital items, at least two group definitions in which the digital item is classified;
    for each digital item in the set of digital items, computing an item desirability score based at least on a session freshness and a long-term freshness of the digital item indicating how recently the digital item was viewed by the user during a current session and multiple sessions, respectively, wherein the session freshness and the long-term freshness of the digital item are different measures of freshness, and wherein a first item and a second item in the set of digital items, when viewed during the current session, have the same session freshness and a different long-term freshness;
    ranking each digital item in the set of digital items relative to the other digital items in the set of digital items based on the respective item desirability scores;
    computing, for each of the at least two group definitions, a group score based on: (i) user group preferences and (ii) the ranked item desirability scores of the digital items in each respective group definition; and
    outputting for display a first group definition, of the at least two group definitions, and the respective digital items in the first group definition, wherein the set of digital items are ordered based on the rank associated with each digital item.

10. The non-transitory computer-readable storage medium of claim 9, wherein identifying the at least two group definitions of the one or more digital items comprises identifying one or more metadata tags associated with a first digital item of the one or more digital items, wherein the item desirability score is further based on: (i) a rating and (ii) a popularity of the digital item.

11. The non-transitory computer-readable storage medium of claim 10, wherein each group definition is defined by a different set of metadata tags, wherein each group definition includes at least one digital item of the one or more digital items, and wherein each metadata tag defining a group definition is included in the one or more metadata tags associated with the at least one digital item included in the group definition.

12. The non-transitory computer-readable storage medium of claim 11, further comprising:
removing each digital item included in the first group definition from the remaining at least two group definitions; and
re-computing the group score for each group definition in the remaining at least two group definitions based on (i) the ranked item desirability scores, (ii) the session freshness, (iii) the long-term freshness, and (iv) a popularity among different users of the digital items in each respective group definition.

13. The non-transitory computer-readable storage medium of claim 12, wherein the re-computed score is further based on the number of digital items associated with a group definition.

14. The non-transitory computer-readable storage medium of claim 12, wherein the re-computed score is further based on the number of metadata tags associated with a group definition.

15. The computer-readable storage medium of claim 14, wherein the user group preferences indicate a user preference of at least one group definition, wherein the user group preferences and user item preferences comprise: (i) explicit and (ii) implicit evidence of a set of metadata tags for which the user has a preference, wherein the implicit evidence is gathered based on interactions of the user with digital items associated with specific metadata tags, wherein each group definition is defined by a different set of metadata tags, wherein each group definition includes at least one digital item of the one or more digital items, and wherein each metadata tag defining a group definition is included in the one or more metadata tags associated with the at least one digital item included in the group definition.

16. (A system, comprising:
one or more computer processors; and
a memory containing a program, which, when executed by the one or more computer processors, performs an operation to recommend digital items to a user, the operation comprising:
identifying, for each digital item in a set of digital items, at least two group definitions in which the digital item is classified;
for each digital item in the set of digital items, computing an item desirability score based at least on a session freshness and a long-term freshness of the digital item indicating how recently the digital item was viewed by the user during a current session and multiple sessions, respectively, wherein the session freshness and the long-term freshness of the digital item are different measures of freshness, and wherein a first item and a second item in the set of digital items, when viewed during the current session, have the same session freshness and a different long-term freshness;
ranking each digital item in the set of digital items relative to the other digital items in the set of digital items based on the respective item desirability scores;
computing, for each of the at least two group definitions, a group score based on: (i) user group preferences and (ii) the ranked item desirability scores of the digital items in each respective group definition; and
outputting for display a first group definition, of the at least two group definitions, and the respective digital items in the first group definition, wherein the set of digital items are ordered based on the rank associated with each digital item.

17. The system of claim 16, wherein the user group preferences indicate a user preference of at least one group definition, wherein the user group preferences and user item preferences comprise: (i) explicit and (ii) implicit evidence of a set of metadata tags for which the user has a preference, wherein the implicit evidence is gathered based on interactions of the user with digital items associated with specific metadata tags.

18. The system of claim 17, wherein each group definition is defined by a different set of metadata tags, wherein each group definition includes at least one digital item of the one or more digital items, and wherein each metadata tag defining a group definition is included in the one or more metadata tags associated with the at least one digital item included in the group definition, wherein the item desirability score is further based on: (i) a rating and (ii) a popularity of the digital item.

19. The system of claim 18, the operation further comprising:
removing each digital item included in the first group definition from the remaining at least two group definitions;
re-computing the group score for each group definition in the remaining at least two group definitions based on (i) the ranked item desirability scores, (ii) the session freshness, (iii) the long-term freshness, and (iv) a popularity among different users of the digital items in each respective group definition; and
outputting for display a second group definition, of the at remaining least one group definitions, and the respective digital items in the second group definition, wherein the second group definition has a group score higher than the remaining at least two group definitions.

* * * * *

UNITED STATES PATENT AND TRADEMARK OFFICE
CERTIFICATE OF CORRECTION

| | | |
|---|---|---|
| PATENT NO. | : 8,903,834 B2 | Page 1 of 1 |
| APPLICATION NO. | : 12/905014 | |
| DATED | : December 2, 2014 | |
| INVENTOR(S) | : John Ciancutti et al. | |

It is certified that error appears in the above-identified patent and that said Letters Patent is hereby corrected as shown below:

In the Claims:

Column 9, Claim 16, Line 37, please delete "("

Signed and Sealed this
Twenty-ninth Day of December, 2015

Michelle K. Lee
*Director of the United States Patent and Trademark Office*